Oct. 8, 1929.  E. A. JOHNSON  1,731,167

OATS SEPARATOR

Filed Oct. 22, 1928

Witness
N. Woodard

Inventor
E. A. Johnson

By H. R. Williamson
Attorneys

Patented Oct. 8, 1929

1,731,167

UNITED STATES PATENT OFFICE

EMIL A. JOHNSON, OF NORTHWOOD, NORTH DAKOTA

OATS SEPARATOR

Application filed October 22, 1928. Serial No. 314,157.

The invention aims to provide a new and improved machine for effectively separating wild oats from tame oats. Wild oats have small heads on one end but are otherwise substantially identical in size and shape with the tame oats, and it is a further object to provide a machine which will take advantage of this natural difference between the two varieties of oats, for withdrawing the wild from the tame.

With the foregoing in view, the invention resides in the novel subject matter hereinafter described and claimed, the description being supplemented by the accompanying drawing.

Figure 1:
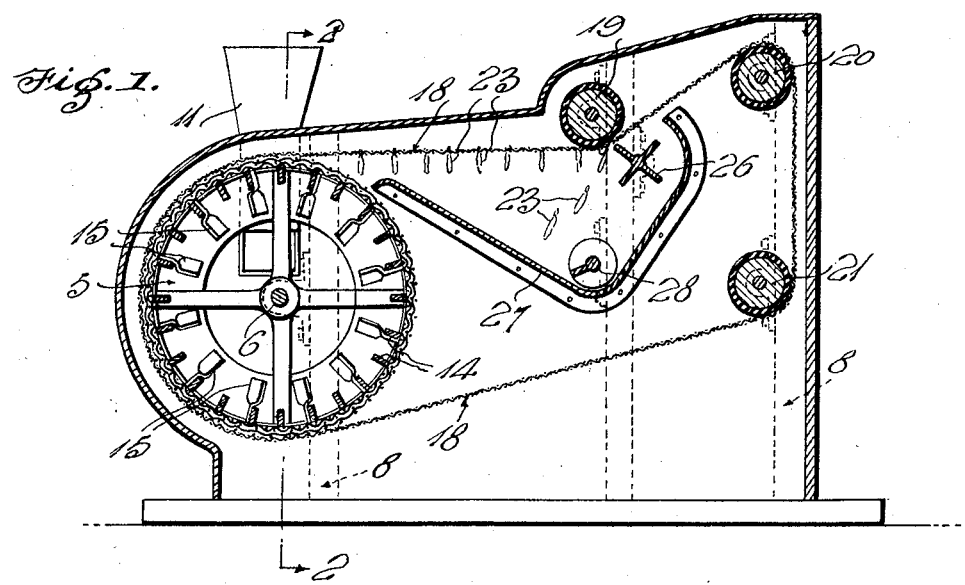
Fig. 1 is a longitudinal section showing one form of separator constructed in accordance with my invention.
Figure 2:
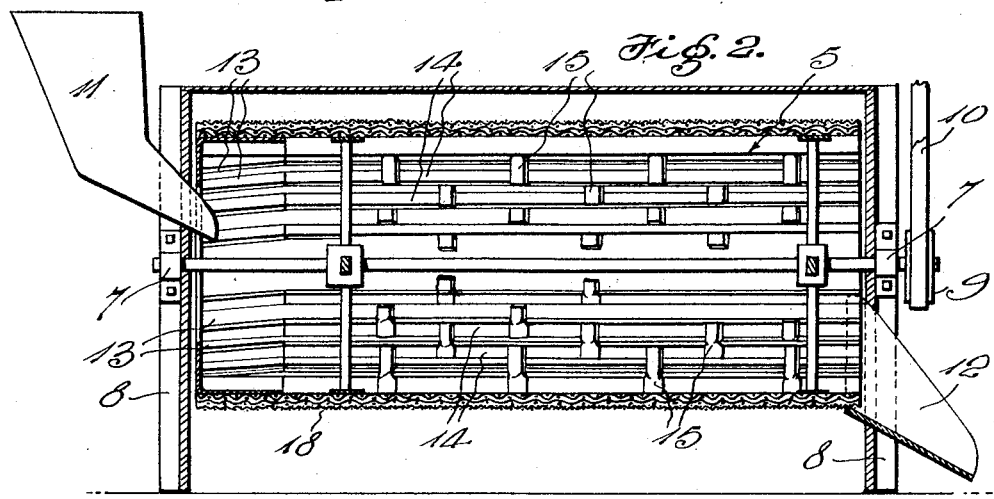
Fig. 2 is a transverse sectional view on line 2—2 of Fig. 1.

In the drawing above briefly described, one embodiment of the invention has been illustrated, but it is to be understood that within the scope of the invention as claimed, numerous variations may be made.

The numeral 5 on the drawings denotes a rotatable, substantially horizontal drum which is mounted upon a shaft 6 in any desired manner. Bearings 7 are shown for this shaft mounted upon a framework 8 and while any desired driving means may be provided for said drum, a pulley 9 and belt 10 have been illustrated. The gist of the invention it is to be understood, is not concerned with any particular driving or mounting means for the drum, nor with any particular framework.

The mixed wild and tame oats are dumped into one end of the drum 5 through a chute 11, the wild oats are carried off in a manner hereinafter described, and the tame oats are discharged through a spout 12. Pitched blades 13 are preferably mounted in the inlet end of the drum 5 to inwardly feed the oats and preferably a plurality of longitudinal slats 14 are secured in said drum to continually pick up and drop the oats. Then too, pitched paddles 15 may be secured to the slats 14 to assist in feeding the oats toward the delivery end of the drum. Here again, these are more or less unessential details in which variations may be made.

The peripheral wall of the drum 5 is formed with a myriad of openings 16 from its inner to its outer side, said openings being each of a diameter considerably greater than the diameter of but less than the length of either the tame or wild oats. Thus, both varieties of oats may enter the openings truly endwise or may tilt into said openings but cannot move truly sidewise into the same.

A belt 18 passes part way around the drum 5 and in the present showing upper and lower reaches of said belt extend substantially horizontally from the drum and are engaged with rollers 19, 20 and 21 mounted upon the framework 8. These rollers are preferably rubber-covered, but I wish it understood that here again, such details as roller construction and belt mounting are more or less unessential, as any desired roller construction and belt mounting could be used. It is essential however, that the belt pass part way around the drum 5 and that it extend under the lower portion of this drum. This belt co-operates with the openings 16 through the drum wall, in forming a plurality of pockets. These pockets are of a depth considerably gerater than the diameter of either the tame oats 22 (Fig. 3) or the wild oats 23, the depth of said pockets being such as to position both varieties of oats endwise to the belt as shown in the figure just referred to.

Figure 3:
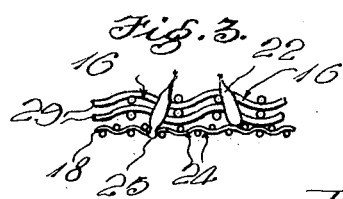
Fig. 3 is an enlarged detail sectional view illustrating at the left the manner in which the wild oats become connected with a traveling belt, by virtue of their heads, and illustrating at the right the manner in which the tame oats will not be molested by the belt.

Belt 18 is formed with a myriad of openings 24 which are of less diameter than either the tame or wild oats. These openings however are of sufficient size to receive the heads 25 found only on the wild oats 23. During rotation of the drum 5, at one time or another, all of the oats will enter the pockets formed by the openings 16 and the belt 18, in endwise relation to this belt as indicated in Fig. 3. The heads 25 of the wild oats become caught in the openings 24 of the belt 18 but the tame oats 22 do not become connected with this belt. The result is that as the upper reach of the belt leaves the drum 5, the wild oats 23 which are connected with said belt by their heads 25 are pulled out of the openings 16 and carried away from the drum. The tame oats however merely drop out of the pockets to the lower portion of the cylinder or drum and are gradually fed to the outlet 12.

While the wild oats 23 could of course be brushed from the belt 18 by hand, I prefer to locate the roller 19 so that it will force the heads 25 inwardly through the openings 24 and to provide a brush, beater or the like 26 at the inner side of the belt for knocking the wild oats from said belt, as shown in Fig. 1. A trough or the like 27 may be provided to catch the oats and a conveyor 28 may carry them off. The parts 26—28 when used, or other parts used in place thereof, may be mounted and driven in any desired way. Then too, it is to be understood that in some instances, it is not necessary to provide a receiving trough such as 27 for the wild oats, although this or analogous provision is preferable.

In the preferred form of construction, the peripheral wall of the drum 5 is formed of two thicknesses 29 of woven wire and the belt 18 is formed of more finely woven wire. I have found that excellent results are obtainable when the layers 29 are formed of No. 4 mesh 18 gauge wire, the meshes being square and those of the two layers being alined with each other to give the requisite thickness to the drum wall to produce pockets of proper depth to receive the oats. The wire of which the belt 18 may be formed is preferably of 16 mesh wire with square mesh weave.

From the foregoing, an understanding of the invention in one of its embodiments may be obtained, and while the construction shown may be used if desired, it is to be considered as illustrative in most respects rather than limiting.

I claim:—

1. A machine for separating wild oats from tame oats, comprising a drum having a myriad of openings from the inner to the outer side of its peripheral wall, said openings being each of a diameter considerably greater than the diameter of but less than the length of either the tame or wild oats, whereby both varieties of oats may enter the openings endwise or may tilt into said openings but cannot move truly sidewise into said openings; a belt passing part way around the drum and under its lower portion, said belt co-operating with said openings in forming pockets of a depth considerably greater than the diameter of either tame or wild oats and adapted to position both varieties endwise to the belt; said belt having a myriad of small openings of less diameter than either the tame or wild oats but of a size to receive the small heads found only on the wild variety; and means for driving the belt and drum, whereby said belt will pull the wild oats from the openings of the drum and they may be removed from said belt.

2. A machine for separating wild oats from tame oats, comprising a drum having a myriad of openings from the inner to the outer side of its peripheral wall, said openings being each of a diameter considerably greater than the diameter of but less than the length of either the tame or wild oats, whereby both varieties of oats may enter the openings endwise or may tilt into said openings but cannot move truly sidewise into said openings; a belt passing part way around the drum and under its lower portion, said belt co-operating with said openings in forming pockets of a depth considerably greater than the diameter of either tame or wild oats and adapted to position both varieties endwise to the belt; said belt having a myriad of small openings of less diameter than either the tame or wild oats but of a size to receive the small heads found only on the wild variety; means for driving the belt and drum, whereby said belt will pull the wild oats from the openings of the drum, and driven means spaced from the drum for removing the wild oats from said belt.

3. A machine for separating wild oats from tame oats, comprising a drum having a myriad of openings from the inner to the outer side of its peripheral wall, said openings being each of a diameter considerably greater than the diameter of but less than the length of either the tame or wild oats, whereby both varieties of oats may enter the openings endwise or may tilt into said openings but cannot move truly sidewise into said openings; a belt passing part way around the drum and under its lower portion, said belt co-operating with said openings in forming pockets of a depth considerably greater than the diameter of either tame or wild oats and adapted to position both varities endwise to the belt; said belt having a myriad of small openings of less diameter than either the tame or wild oats but of a size to receive the small heads found only on the wild variety; means for driving the belt and drum, whereby said belt will pull the wild oats from the openings of the drum, a roller spaced from the drum and contacting with said belt to force the heads of the wild oats back through the openings of the belt, and means at the inner side of said belt for knocking the oats therefrom.

4. A structure as specified in claim 1; said drum wall being formed of a plurality of layers of woven wire with the meshes of the layers alined to form said openings through the drum wall; said belt being formed of more finely woven wire.

In testimony whereof I have hereunto affixed my signature.

EMIL A. JOHNSON.